United States Patent [19]
Barrett et al.

[11] Patent Number: 5,908,467
[45] Date of Patent: Jun. 1, 1999

[54] SYSTEM AND METHOD FOR DISPLAYING FILE PARAMETERS

[75] Inventors: Robert Carl Barrett; Daniel Clark Kellem, both of San Jose; Paul Philip Maglio, Santa Cruz; Edwin Joseph Selker, Palo Alto, all of Calif.

[73] Assignee: International Business Machines Corporation, Armonk, N.Y.

[21] Appl. No.: 08/656,458

[22] Filed: May 31, 1996

[51] Int. Cl.⁶ .................................................. G06F 13/00
[52] U.S. Cl. .............. 709/218; 395/200.48; 395/200.33; 707/2; 707/5; 707/101
[58] Field of Search ............................... 395/200.48, 156, 395/157, 600, 762, 793, 500, 200.33; 707/2, 513, 5, 101, 501

[56] References Cited

U.S. PATENT DOCUMENTS

| | | | |
|---|---|---|---|
| 5,204,947 | 4/1993 | Bernstein et al. | 395/157 |
| 5,297,249 | 3/1994 | Bernstein et al. | 395/156 |
| 5,355,472 | 10/1994 | Lewis | 395/600 |
| 5,446,891 | 8/1995 | Kaplan et al. | 395/600 |
| 5,572,643 | 11/1996 | Judson | 395/793 |
| 5,666,542 | 9/1997 | Katai et al. | 395/762 |

OTHER PUBLICATIONS

Brown et al., "Using Netscape 2", Que Corporation, entire reference, Aug. 1995.
R. Armstrong, D. Freitag, T. Joachims, & T. Mitchell Web Watcher: A Learning Apprentice for the World Wide Web, AAAI Spring Symposium, Mar. 27–29, 1995, Stanford Univ. Info Gathering from Hetergenous, Distributed Environment.

*Primary Examiner*—Frank J. Asta
*Assistant Examiner*—Ivan C. Pierce, III
*Attorney, Agent, or Firm*—McGinn & Gibb, P.C.; Romualdis Strimaitis, Esq.

[57] ABSTRACT

A system and method are provided, for use with network communication systems such as Internet terminals having World Wide Web browsers, for indicating to the user a parameter related to a piece of remote information, such as an estimation of a length of time required to download a given piece of information resident at a remote site. Hyperlinks, icons, or menu items are displayed, as in conventional systems. Also provided are indicia which give the user the length of time estimate. The indicia may be displayed concurrently with the displayed hyperlink, or otherwise provided, such as by audio or tactile user feedback. In one preferred embodiment, each hyperlink is accompanied by a red, yellow, or green dot, the color of the dot being representative of the estimated download time.

60 Claims, 5 Drawing Sheets

SYSTEM AND METHOD FOR DISPLAYING FILE PARAMETERS

FIELD OF THE INVENTION

The invention generally relates to the field of communication networks and architectures. More particularly, the invention relates to graphical user interface (GUI) systems which display graphical representations, such as icons or menu items, of functional entities such as applications. The invention has particular applicability to HTML graphical items, such as World Wide Web pages having hyperlinks to other Internet resources.

GLOSSARY OF TERMS USED

While dictionary meanings are also implied by certain terms used here, the following glossary of some terms may be useful.

Graphical User Interface (GUI): A computer user interface characterized by the visual "desktop" paradigm, having images, windows, icons, and graphical menus representative of data objects, functions, or application programs, and utilizing a cursor, movable by a user input device such as a mouse, for selecting and manipulating the icons, etc., by clicking on mouse input buttons; as distinct from a character- or text-oriented user interface Internet ("the Net"): A connection system that links computers worldwide in a network.

TCP/IP Transmission Control Protocol/Internet Protocol. A packet switching scheme the Internet uses to chop, route, and reconstruct the data it handles, from e-mail to video.

World Wide Web (WWW. "the Web"): The Internet's multimedia application that lets people seeking information on the Internet switch from server to server and database to database by clicking on highlighted words or phrases of interest An Internet Web server supports clients and provides information.

Home page: A multimedia table of contents that guides a Web user to stored information on the Internet.

Server: A machine (computer) which performs a task at the command of another machine ("client"). In the context of the present invention, a server's primary function is to facilitate distribution of stored information over the Web.

Client: A machine which provides commands to a server, and is serviced by the server. Typically, a client machine is operated by an end user, and functions responsive to user commands.

Web Browser: A program running on a user-operated client computer. When a user "surfs" the Web using a browser, the browser acts as an Internet tour guide, allowing the client machine to display pictorial desktops, directories and search tools supported by the server.

URL: Universal Resource Locator, a Web document version of an e-mail address, in character string form, which uniquely identifies a document, application, or tool available over the Web.

Hyperlink: A network addressing tool embedded in a user-understandable displayed and/or highlighted item, such as a word, phrase, icon or picture. A URL can be accessed by means of its corresponding Hyperlink. When a user on a client machine selects the highlighted hyperlink through the user interface, the underlying item is then retrieved to the client supporting a Web browser.

HTTP Hypertext transfer protocol: Hypertext transfer protocol. The character string "http:" at the beginning of a URL indicates that the document or file designated by the URL contains hyperlinks defined according to the HTTP.

HyperText Markup Language (HTML): HTML is the language used by Web servers to create and connect documents that are viewed by Web clients. HTML uses Hypertext documents. Other uses of Hypertext documents are described in the following U.S. Patents:

Bernstein et al., 5,204,947, issued Apr. 20, 1993;
Bernstein et al., 5,297,249, issued Mar. 22, 1994; and
Lewis, 5,355,472, issued Oct. 11, 1994;

all of which are assigned to International Business Machines Corporation, and which are referenced herein.

BACKGROUND OF THE INVENTION

In recent years, the technology of multimedia storage and interactive accessing has converged with that of network communications technologies, to present exciting prospects for users who seek access to remotely stored multimedia information. Particularly exciting has been the recent prominence of the Internet and its progeny, the World Wide Web. The Internet and the Web have captured the public imagination as the so-called "information superhighway." Accessing information through the Web has become known by the metaphorical term "surfing the Web."

The Internet is not a single network, nor does it have any single owner or controller. Rather, the Internet is an unruly network of networks, a confederation of many different networks, public and private, big and small, whose human operators have agreed to connect to one another.

The composite network represented by these networks relies on no single transmission medium. Bi-directional communication can occur via satellite links, fiber-optic trunk lines, phone lines, cable TV wires, and local radio links. However, no other communication medium is quite as ubiquitous or easy to access as the telephone network. The number of Web users has exploded, largely due to the convenience of accessing the Internet by coupling home computers, through modems, to the telephone network. As a consequence, many aspects of the Internet and the Web, such as network communication architectures and protocols, have evolved based around the premise that the communication medium may be one of limited bandwidth, such as the telephone network.

To this point the Web has been used in industry predominately as a means of communication, advertisement, and placement of orders. The Web facilitates user access to information resources by letting the user jump from one Web page, or from one server, to another, simply by selecting a highlighted word, picture or icon (a program object representation) about which the user wants more information. The programming construct which makes this maneuver possible is known as a "hyperlink".

In order to explore the Web today, the user loads a special navigation program, called a "Web browser" onto his computer. A browser is a program which is particularly tailored for facilitating user requests for Web pages by implementing hyperlinks in a graphical environment. If a word or phrase, appearing on a Web page, is configured as an hyperlink to another Web page, the word or phrase is typically given in a color which contrasts with the surrounding text or background, underlined, or otherwise highlighted. Accordingly, the word or phrase defines a region, on the graphical representation of the Web page, inside of which a mouse click will activate the hyperlink, request a download of the linked-to page, and display the page when it is downloaded.

There are a number of browsers presently in existence and in use. Common examples are the NetScape, Mosaic and IBM's Web Explorer browsers. Browsers allow a user of a client to access servers located throughout the world for information which is stored therein. The information is then provided to the client by the server by sending files or data packets to the requesting client from the server's storage resources.

Part of the functionality of a browser is to provide image or video data. Web still image or video information can be provided, through a suitably designed Web page or interface, to a user on a client machine. Still images can also be used as Hypertext-type links, selectable by the user, for invoking other functions. For instance, a user may run a video clip by selecting a still image.

A user of a Web browser who is researching a particular area of interest will often move from one home page, to another, to another, etc., by hyperlinking from each successive page to the next. As discussed above, each successive Web page must be downloaded. Web surfers have become acutely aware of the often significant amounts of real time required to download a Web page, video clip, etc. This time delay can often be measured in tens of seconds, or even in minutes. While such a download is taking place, the user must sit idle and wait.

Thus, an important design objective in an Internet/Web architecture is throughput. Unfortunately, the bandwidth of most Internet communication media is limited, and the volume of traffic is growing as more users gain access to the Internet. Therefore, users are becoming acutely aware of the delays inherent in downloading information.

It is foreseeable that the future will hold a race between the increasing throughput capacity of state-of-the-art communication media, such as fiber optic communication lines, versus the ever-increasing volume of traffic as more and more users take advantage of more and more information coming on line.

For the present, users, clicking on a hyperlink, have no way of knowing, in advance, how much information lies behind the hyperlink, how long the information will take to download, or how much information is displayed prior to the end of the download process. (With regard to the latter issue, some Web pages cannot be viewed at all during the download process. Others provide usable slider bars, so that a user can view the portion already downloaded, while the remainder is still in transit Others use a rastering scheme to allow an image to be viewed while interspersing raster lines are still in transit.)

Therefore, conventional Web browsers have had the drawback that users have been unable to tell how long a download for a given hyperlink would take, unless they actually clicked on the hyperlink. After that, they were committed to waiting out the download, regardless of how long it took, unless they took the action of terminating the download.

SUMMARY OF THE INVENTION

Accordingly, it is an object of the invention to provide functionality to a user, in conjunction with a Web surfing session, which has not been provided by conventional Web browsers.

To achieve these and other objective, there is provided in accordance with the invention a method for displaying multimedia information, such as a Web page, having user-selectable hyperlinks, including the step of displaying, along with the hyperlink, indicia which indicates to a user an estimate of the length of time it would take to download the linked page.

In a preferred embodiment of the invention, the indicia include colored markers, positioned next to the hyperlinks, whose colors provide the indication of the estimated download time.

In accordance with the invention, a method is provided for ascertaining the download time estimate, in which the system, transparently to the user, sends a test message to the remote site of the hyperlinked page, and receives a response. Based on factors such as the turn-around time for receiving the response, the system estimates the length of time a full download would require. The system then selects one of the indicia, and displays it.

While the invention is primarily disclosed as a method, it will be understood by a person of ordinary skill in the art that an apparatus, such as a conventional data processor, including a CPU, memory, I/O, program storage, a connecting bus, and other appropriate components, could be programmed or otherwise designed to facilitate the practice of the method of the invention. Such a processor would include appropriate program means for executing the method of the invention.

Also, an article of manufacture, such as a pre-recorded disk or other similar computer program product, for use with a data processing system, could include a storage medium and program means recorded thereon for directing the data processing system to facilitate the practice of the method of the invention. It will be understood that such apparatus and articles of manufacture also fall within the spirit and scope of the invention.

DESCRIPTION OF THE PREFERRED EMBODIMENT

The invention will be described below, in terms of an area of particular applicability: the area of Internet/World Wide Web communications, employing HTML architecture and displayed hyperlinks for linking to remotely stored Web pages. However, the concepts embodied thusly also have wider applicability to any desired, remotely-stored information, such as a data object, a program, etc. Whether the remote information is to be displayed, to be invoked for execution, etc., the invention is applicable to provide the user with information regarding a parameter associated with the remotely-stored information.

The information relating to the parameter will be generally referred to herein as an "indicator" (singular) or as "indicia" (plural). Note, however, that except where the context mandates a plurality of indicia, the term "indicia" may be used as a partitive noun, not necessarily implying a singular/plural limitation.

With this broader applicability of the invention in mind, let us now consider, for illustrative purposes, an environment in which the invention is believed to have particular applicability, that of the World Wide Web.

Figure 1:
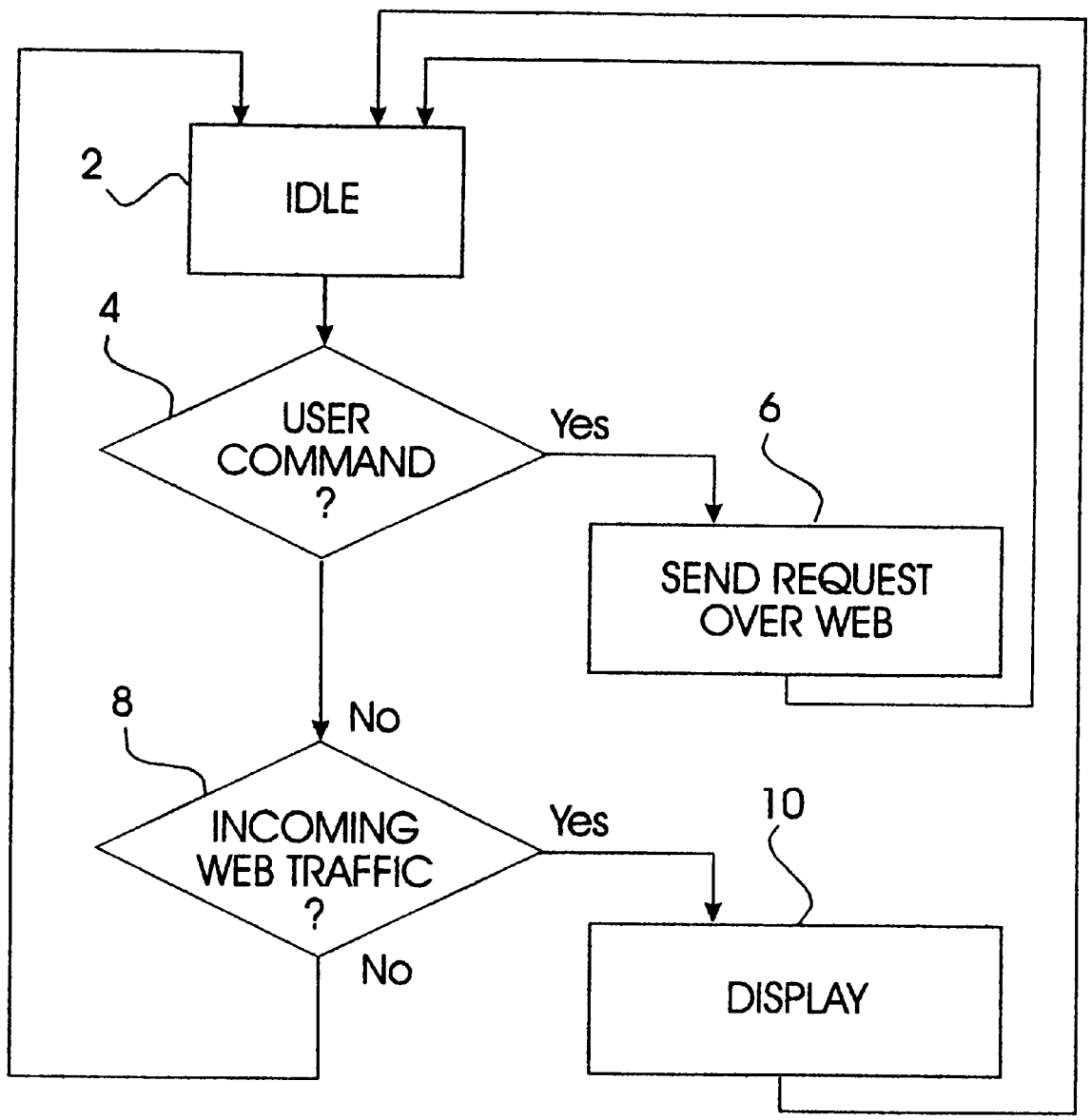
FIG. 1 is a high-level flowchart of the basic functionality of a Web browser.

FIG. 1 is a high-level flowchart showing the functionality of a Web browser. Essentially, FIG. 1 focuses on the functionality of the browser in response to external stimuli. All internal processing is shown generally as an idle state (step 2).

In response to interrupts, or other suitable implementations, the browser determines that a user input command, such as a mouse click on a hyperlink or a "carriage return" following entry of a URL, has been made (step 4). The browser responds by sending the appropriate command over the communication line to the Internet (step 6).

Alternatively, in response to interrupts, or other suitable implementations, the browser determines that a message, such as a downloaded Web page, has been received over the Internet (step 8). The browser responds by displaying the newly received page (step 10).

The functionality, described at this level, is essentially similar to that of a conventional browser. However, in accordance with the invention, further functionality is made, to estimate turn-around times for downloading of hyperlinked pages. Skilled programmers would find suitable ways of implementing this functionality in a system such as that of FIG. 1.

Figure 2:
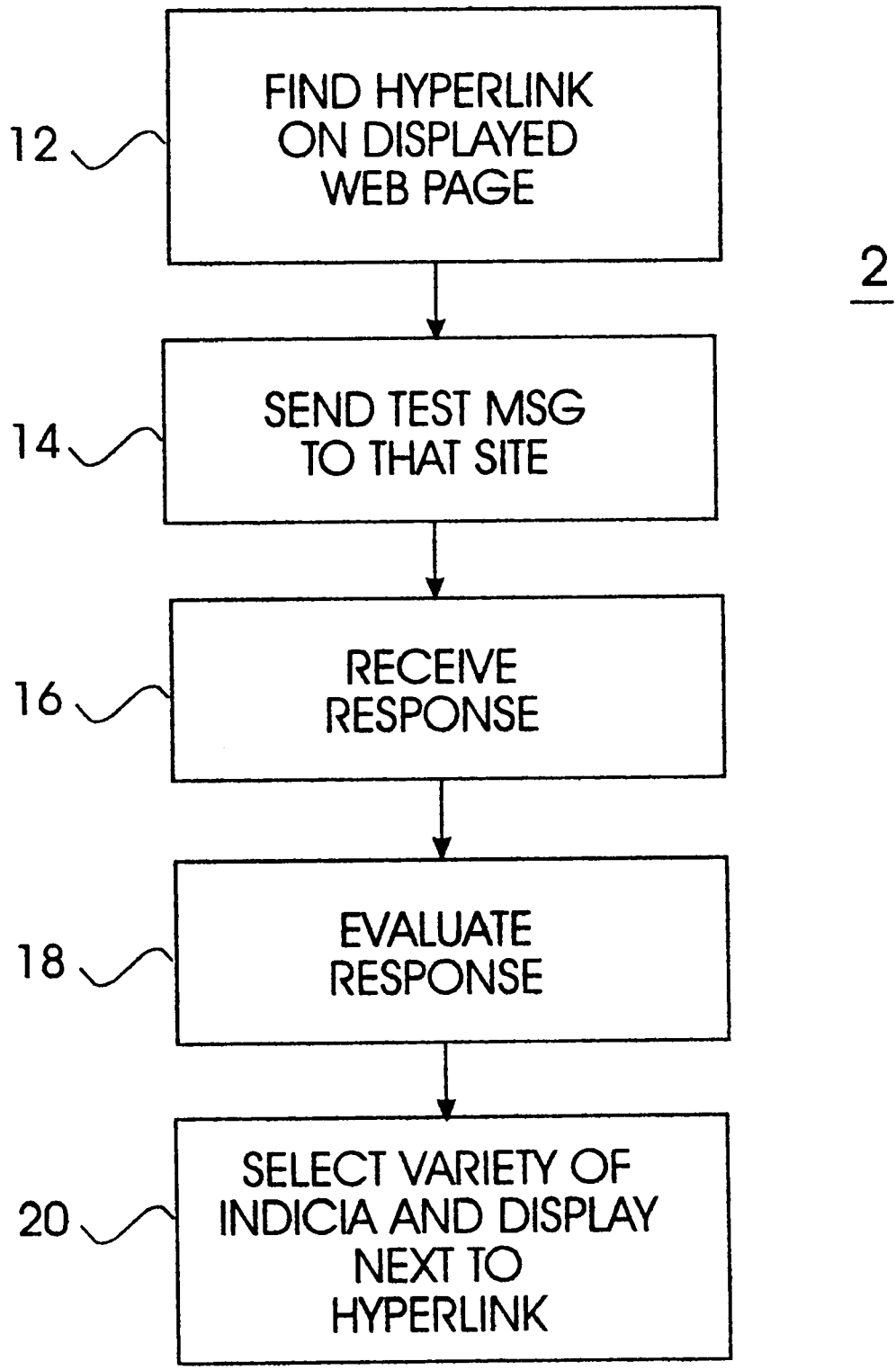
FIG. 2 is a flowchart showing functionality which, in accordance with the invention, is added to that of FIG. 1

One possible implementation is that shown in FIG. 2. FIG. 2 is a flowchart showing some of the activity which is added to the idle step 2 of FIG. 1, for implementation of the invention.

While a browser is idling, it will be assumed that a Web page is being displayed, and the user is examining the page. The user may be considering hyperlinking to another page by clicking on a hyperlink, several of which are assumed to be displayed as part of the Web page. However, since the completion of the downloading of the presently displayed page, the user has taken no action.

In step 12, the system identifies one of the hyperlinks displayed. The task at hand is to give the user a visual indication of how long it would take to download that hyperlink's Web page. The download time is influenced by factors such as the size of the page, its content (images, or merely test), and the amount of Web traffic between the user and the remote server on which the page resides.

The downloading delay caused by traffic is measured by simply sending a test message from the local user to the remote server (step 14). The test message need not be in any particular form, except that it requests a response message from the remote server. Preferably, the test message and the response are both short in duration. This allows the system to perform similar test message transmissions for all of the other displayed hyperlinks, without causing a delay noticeable to the user.

Note that the terminology "test message" places no restrictions on the particular format or content of the message, but merely denotes that its purpose is to test the response time between the local user's system and the remote site (server or the like) at which the hyperlinked information resides.

In step 16, the user receives a response from the remote server. The user then evaluates the response (step 18). This can be done by measuring the amount of real time between transmission of the test message and receipt of the response. This time interval is used as an estimate of the download time.

Since the download time is also influenced by the size of the downloaded page, the response message may also include information indicative of the size of the page. Step 18 takes this information into account also, if applicable.

Finally, after the estimation has been made, the indicia are selected and displayed (step 20).

It will be understood that there are numerous types of indicia that could be used. However, in order to give a more detailed description of certain aspects of the invention, an exemplary type of indicia will be discussed. This type of indicia is utilized in a preferred embodiment of the invention.

The indicia used in this preferred embodiment include colored dots which are positioned next to the displayed hyperlinks. The colors of the dots give a qualitative estimation of the download time. That is, for instance, green indicates a short download time, yellow a moderate download time, and red a long download time.

Figure 3:
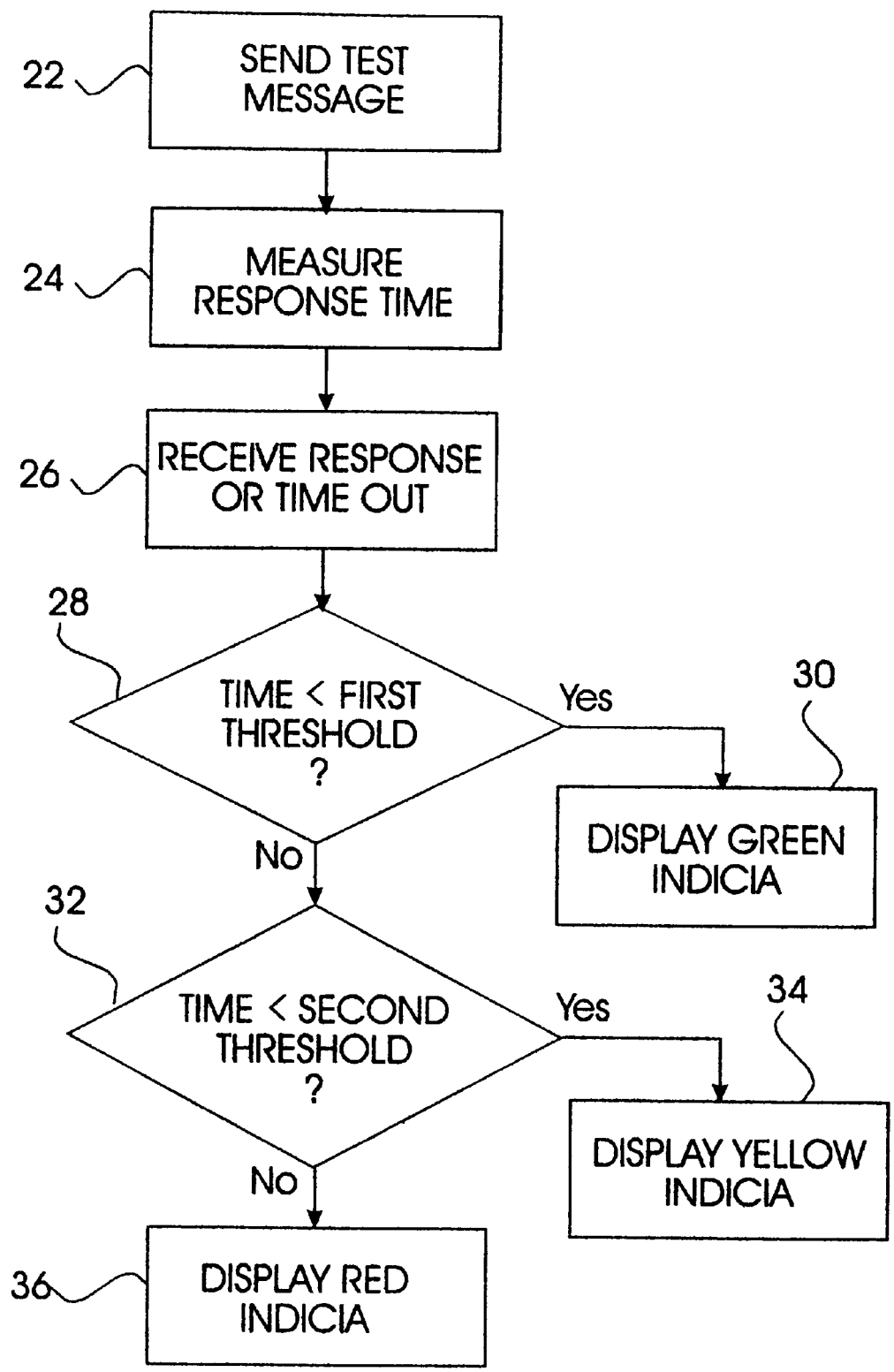
FIG. 3 is a more detailed flowchart showing a preferred implementation of part of FIG. 2.
Figure 4:
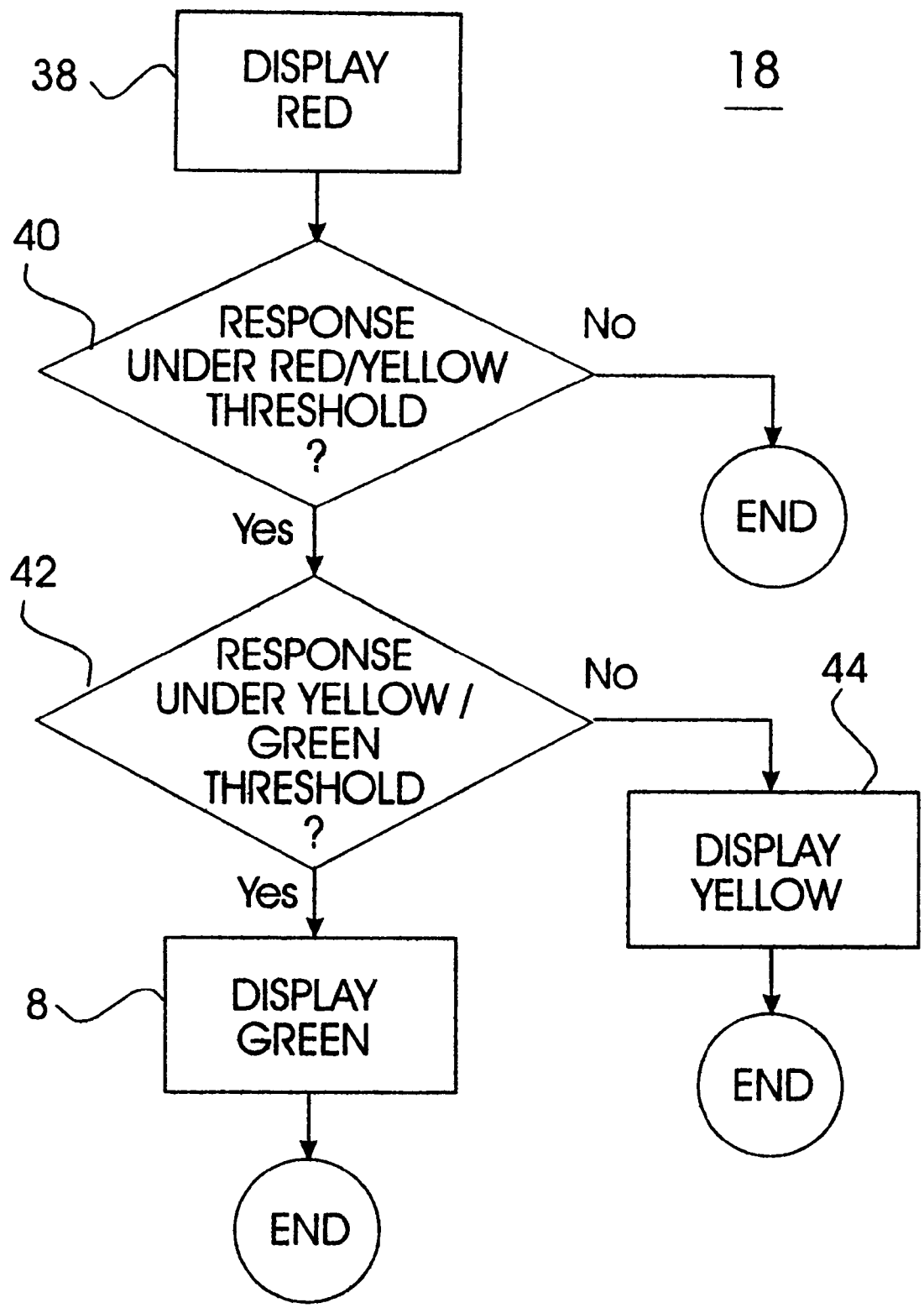
FIG. 4 is a more detailed flowchart showing an alternative implementation of the part of FIG. 2.
Figure 5:
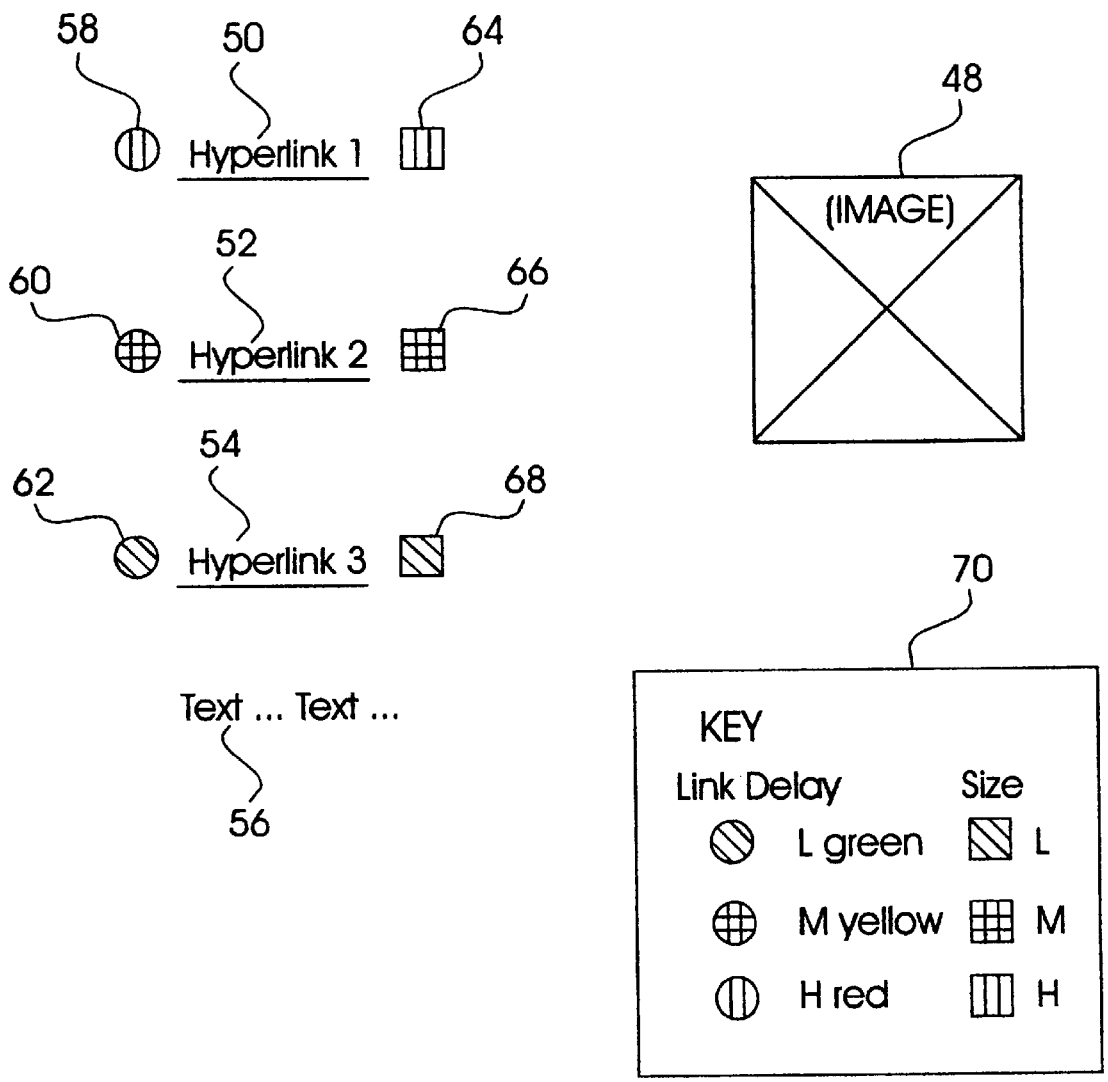
FIG. 5 is an image of an exemplary Web page, showing indicia as per FIG. 3 or FIG. 4.

For the description that follows, reference is made to FIGS. 3 and 4, two flowcharts showing more detailed implementations of step 20 of FIG. 2, and to an exemplary Web page shown in FIG. 5.

Referring to FIG. 3, step 20 is preferably implemented as follows: Initially, a test message is sent (step 20), and time is measured (step 22) until either a response is received or a timeout value is reached (step 24), the latter indicating that the response time is so great that the system elects to stop waiting any further.

The response time is compared against a first threshold (step 28). If the time is less than the threshold, then a green indicator is displayed (step 30). Otherwise, the time is compared against a second threshold (step 32). If the response time is less than the second threshold, then a yellow indicator is displayed (step 34). Otherwise, a red indicator is displayed (step 36).

Skilled programmers will recognize numerous equivalent variants of this basic approach, such as making the comparison steps 28 and 32 less-than-or-equal-to, rather than less-than, tests, changing the number of threshold values (in general, n-1 threshold value tests provide for n distinct indicia values), etc.

Referring now to FIG. 4, step 20 is alternatively implemented as follows: Initially, a default value for the indicia is displayed. For instance, red, indicating a long delay, is displayed (step 38). When the test message/response time delay is measured, it is compared against threshold values for red/yellow and yellow/green (steps 40 and 42). Depending on where the time delay falls with respect to these threshold values, yellow (step 44) or green (step 46) is displayed.

In normal operation, it is expected that the message exchanges will take place quickly enough that the color updates will be too quick for a user to notice, or that they will take place quickly enough to provide no inconvenience to the user. However, if the delays are long enough to be visible, then the approach of FIG. 4 might be regarded as preferable in that it provides an indicia value initially, rather than leaving the indicia blank or unspecified. Accordingly, the user is not kept waiting in uncertainty, and, in the event of a long delay time, the indicia are already the correct color.

Referring now to FIG. 5, there is shown a Web page having an image 48, such as a photograph, three hyperlinks 50, 52, and 54, and a body of un-hyperlinked text 56. Indicia 58, 60, and 62, are shown, respectively next to the hyperlinks 50, 52, and 54. The indicia respectively indicate high (red), medium (yellow), and low (green) download times. (Note that the indicia are cross-hatched for color representation as per the United States Patent and trademark Office publication "Guide for Patent Draftsmen," (PAT-012.1-7502 rev. 1975).)

The green-yellow and yellow-red threshold times may be selected in any suitable fashion. They may be preselected and fixed by the system, or may be selectable or programmable by the user. Also, while three indicia, green, yellow, and red, are used in this preferred embodiment, any suitable number of indicia may be used.

In addition, different indicia may be used for a single hyperlink, to indicate different aspects of the estimated download delay. For instance, as shown in FIG. 5, a first indicator (e.g., the indicia 42, 44, and 46) might estimate the link traffic, based on a test message/response time delay, and a second indicator (e.g., the indicia 64, 66, and 68) might be based on size information contained in the response message. To distinguish between these multiple indicia, they might be positioned on predetermined, opposite sides of the hyperlink, or they might have different shapes of different sets of possible colors, as shown. Other schemes for distinguishing the indicia may also be used, as would be known by a person skilled in the art.

While the preferred embodiment shows the indicia as including colored "bullets", such as round dots and squares, any other form of indicia, which would be suitably eye-catching or easily discernable to the user, could be used. For instance, the background or texture of the hyperlink itself could change to reflect the information conveyed by the indicia. Where the hyperlink is a word or phrase, the font, underlining, boldness, etc., could change to reflect the information being conveyed.

Also, if a system has the capacity to "beep" or make sounds audible to the user, then the indicia could be implemented as a suitable set of sounds, such as sounds of different pitches, rapid-fire beeps varying in number or speed, or programmable tunes.

Finally, some keyboard products are being marketed, having joystick-type cursor movement controllers, such as IBM Corp.'s TrackPoint II(™) in-keyboard pointing devices. In particular, some of these devices have piezoelectric or other elements built-in, for providing a tactile feedback to the user's fingertip. For instance, as the user moves the cursor across a window boundary, the user feels a "bump." Indicia could also be conveyed to the user through such tactile feedback, while the cursor rests on the hyperlink, etc.

On the other hand, even if only one indication is used for a given hyperlink, to indicate an overall estimated delay time, the indication might be duplicated in the vicinity of the hyperlink, such as being on either side of a hyperlinked word or phrase, for enhanced user visibility.

Where such visible indicia are used, the system may also provide a key 70, preferably in a suitable, otherwise unused portion of the Web page, to help the user to recognize the meanings of the indicia. For each of the indicia, the key may contain a representative sample of the colored "bullet," as shown, or a suitable verbal description, such as "high-pitched beep", "three fast beeps", etc.

While the invention has thus far been described as being incorporated into a Web browser, it is also possible to implement the invention as a separate component in a communication network architecture. For instance, the invention could be implemented as a separate software program which monitors transmission between a user and the Internet, which identifies the hyperlinks based on the monitoring, and which overlays the results of the download time estimations onto the Web page as it is received by the user.

Note that, while the invention is described primarily in terms of use with hyperlinks on Web pages, the invention also has broader applicability to icons, pull-down menu items, soft buttons, etc. For a local- or wide-area-networked system, in which a local GUI includes representations of entities (e.g., applications) resident on a remote system, indicia similar to those disclosed herein could also be used.

While the invention has particularly advantageous applicability to representations of network download time estimations, indicia could also be used for representing other parameters of interest to the user. For instance, where access to a remote entity entails a cost, indicia could be used to display either a range of costs into which the cost of the entity would fall. Alternatively, a short character string could be used as the indicia themselves, the string giving a price for the entity. If the entity includes text, indicia could be used to identify the language of the text.

If the local GUI system can ascertain a current state of the system, e.g., which applications are running, then indicia could also be used to indicate the appropriateness of the entity. For instance, where a spreadsheet application is running, the indicia for a text data file could indicate inappropriateness, while a spreadsheet data file previously made by the user, using the spreadsheet application, could be indicated as appropriate for re-loading into the spreadsheet application.

Using the foregoing specification, the invention may be implemented using standard programming and/or engineering techniques using computer programming software, firmware, hardware or any combination or subcombination thereof. Any such resulting program(s), having computer readable program code means, may be embodied or provided within one or more computer readable or usable media such as fixed (hard) drives, disk, diskettes, optical disks, magnetic tape, semiconductor memories such as read-only memory (ROM), etc., or any transmitting/receiving medium such as the Internet or other communication network or link, thereby making a computer program product, i.e., an article of manufacture, according to the invention. The article of manufacture containing the computer programming code may be made and/or used by executing the code directly from one medium, by copying the code from one medium to another medium, or by transmitting the code over a network.

An apparatus for making, using, or selling the invention may be one or more processing systems including, but not limited to, a central processing unit (CPU), memory, storage devices, communication links, communication devices, servers, I/O devices, or any subcomponents or individual parts of one or more processing systems, including software, firmware, hardware or any combination or subcombination thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system and/or computer subcomponents embodying the invention and to create a computer system and/or computer subcomponents for carrying out the method of the invention. While the preferred embodiment of the present invention has been illustrated in detail, it should be apparent that modifications and adaptations to that embodiment may occur to one skilled in the art without departing from the spirit or scope of the present invention as set forth in the following claims.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for facilitating a display, at a local display unit as a client of a parameter related to desired information, wherein said parameter is associated with at least one of a file type, a file size, and a file length of said desired information, the desired information residing on a remote site and being accessible over a communication network coupled to the local display unit, the method comprising;

displaying a user-selectable link to the desired information which is coupled to the network, at a time other than creation of the user-selectable link, obtaining by said client, information related to the parameter of the desired information and editing the desired information retrieved from the remote site by the client in accordance with the parameter information; and providing an indicator related to the parameter in association with the displayed, user-selectable link.

2. A method as recited in claim 1, wherein the step of displaying a user-selectable link includes displaying one of (i) an icon, and (ii) a menu item.

3. A method as recited in claim 1, wherein:

the communication network includes the Internet; and the step of displaying a user-selectable link includes displaying a hyperlink as part of a displayed World Wide Web page.

4. A method as recited in claim 1, wherein the step of obtaining includes:

sending a test message to the remote site; and receiving a response message from the remote site.

5. A method as recited in claim 4, wherein the parameter, whose related information is obtained by the step of obtaining, includes a length of time required to download the second information from the remote site.

6. A method as recited in claim 4, wherein the step of obtaining further comprises extracting a parameter contained within the response message.

7. A method as recited in claim 6, wherein the step of extracting includes extracting a parameter related to one of:

(i) a size of the desired information, (ii) a cost of the desired information, (iii) a quality of the desired information, and (iv) a language of text within the desired information.

8. A method as recited in claim 6, wherein:

the local display unit is operating in accordance with an operating context, for which different information items have differing degrees of appropriateness therewithin; and the step of extracting includes extracting a parameter related to an appropriateness of the desired information.

9. A method as recited in claim 1, wherein:

the parameter has a range of possible values; and the step of providing an indicator includes providing one of a set of different indicia, each one of the indicia representing a respective portion of the range of values of the parameter.

10. A method as recited in claim 9, wherein the step of providing an indicator includes one of (i) displaying a visible indicator, (ii) providing an audible indicator, and (iii) providing a tactile indicator.

11. A method as recited in claim 9, wherein:

the parameter includes an estimated length of time for downloading the desired information; and each successive one of the indicia represents a successively longer length of time.

12. A method as recited in claim 11, wherein:

a set of time delay threshold values delimit ranges of delay times, each range corresponding with one of the indicia; and the step of providing an indicator includes determining within which range the estimated time falls, and displaying the one of the indicia corresponding with that range.

13. A method as recited in claim 8, wherein the step of providing an indicator includes displaying one of a set of indicia, the indicia of the set being distinct from each other in terms of at least one of (i) shape, and (ii) color.

14. A method as recited in claim 8, wherein:

the method further comprises the step of the user positioning a cursor on the displayed user-selectable link; and the step of providing an indicator includes one of (i) providing an audible signal, and (ii) providing tactile feedback through a cursor positioning device used by the user to perform the step of positioning.

15. A method as recited in claim 9, wherein:

the parameter includes one of:

(i) a cost, within a portion of a range of costs, associated with the desired information;

(ii) a price, the indicator therefor being expressed in terms of a character string; and (iii) a language, the desired information including text in the language.

16. A method as recited in claim 9, wherein:

the system has a current state, for which different information items have different degrees of appropriateness; and the parameter includes an indication of appropriateness of the desired information based on the current state of the system.

17. A method as recited in claim 9, the method further comprises the steps of:

obtaining information related to a second parameter of the desired information; and providing a second indicator related to the second parameter, concurrently with the first-recited parameter, in association with the displayed, user-selectable link.

18. A system for facilitating a display, at a local display unit as a client of a parameter related to desired information, wherein said parameter is associated with at least one of a file type, a file size, and a file length of said desired information, the desired information residing on a remote site as a server and being accessible over a communication network coupled to the local display unit, the system comprising:

means for displaying a user-selectable link to the desired information which is coupled to the network;

means for obtaining by said client, at a time other than creation of the user-selectable link, information related to the parameter of the desired information and editing the desired information retrieved from the remote site by the client in accordance with the parameter information; and means for providing an indicator related to the parameter in association with the displayed, user-selectable link.

19. A system as recited in claim 18, wherein the means for displaying a user-selectable link includes means for displaying one of (i) an icon, and (ii) a menu item.

20. A system as recited in claim 18, wherein:

the communication network includes the Internet; and the means for displaying a user-selectable link includes means for displaying a hyperlink as part of a displayed World Wide Web page.

21. A system as recited in claim 18, wherein the means for obtaining includes:

means for sending a test message to the remote site; and means for receiving a response message from the remote site.

22. A system as recited in claim 21, wherein the parameter, whose related information is obtained by the means for obtaining, includes a length of time required to download the second information from the remote site.

23. A system as recited in claim 21, wherein the means for obtaining further comprises means for extracting a parameter contained within the response message.

24. A system as recited in claim 23, wherein the means for extracting includes means for extracting a parameter related to one of:

(i) a size of the desired information, (ii) a cost of the desired information, (iii) a quality of the desired information, and (iv) a language of text within the desired information.

25. A system as recited in claim 23, wherein:

the local display unit is operating in accordance with an operating context, for which different information items have differing degrees of appropriateness therewithin; and the means for extracting includes means for extracting a parameter related to an appropriateness of the desired information.

26. A system as recited in claim 18, wherein:

the parameter has a range of possible values; and the means for providing an indicator includes means for providing one of a set of different indicia, each one of the indicia representing a respective portion of the range of values of the parameter.

27. A system as recited in claim 26, wherein the means for providing an indicator includes one of (i) means for displaying a visible indicator, (ii) means for providing an audible indicator, and (iii) means for providing a tactile indicator.

28. A system as recited in claim 26, wherein:

the parameter includes an estimated length of time for downloading the desired information; and each successive one of the indicia represents a successively longer length of time.

29. A system as recited in claim 28, wherein:

a set of time delay threshold values delimit ranges of delay times, each range corresponding with one of the indicia; and the means for providing an indicator includes means for determining within which range the estimated time falls, and for displaying the one of the indicia corresponding with that range.

30. A system as recited in claim 25, wherein the means for providing an indicator includes means for displaying one of a set of indicia, the indicia of the set being distinct from each other in terms of at least one of (i) shape, and (ii) color.

31. A system as recited in claim 25, wherein:

the means for providing an indicator includes means, operable responsive to the user positioning a cursor on the displayed user-selectable link, for one of (i) providing an audible signal, and (ii) providing tactile feedback through a cursor positioning device used by the user to perform the step of positioning.

32. A system as recited in claim 26, wherein:

the parameter includes one of:

(i) a cost, within a portion of a range of costs, associated with the desired information;

(ii) a price, the indicator therefor being expressed in terms of a character string; and (iii) a language, the desired information including text in the language.

33. A system as recited in claim 26, wherein:

the system has a current state, for which different information items have different degrees of appropriateness; and the parameter includes an indication of appropriateness of the desired information based on the current state of the system.

34. A system as recited in claim 26, further comprising:

means for obtaining information related to a second parameter of the desired information; and means for providing a second indicator related to the second parameter, concurrently with the first-recited parameter, in association with the displayed, user-selectable link.

35. A computer program product, for use with a processing system having a local display unit as a client, for facilitating a display, at the local display unit, of a parameter related to desired information, wherein said parameter is associated with at least one of a file type, a file size, and a file length of said desired information, the desired information residing on a remote site as a server and being accessible over a communication network coupled to the processing system, the computer program product comprising:

a computer-readable medium;

means, recorded on the medium, for directing the processing system to display a user-selectable link to the desired information which is coupled to the network;

means, recorded on the medium, for directing the processing system to obtain by said server, at a time other than creation of the user-selectable link, information related to the parameter of the desired information, and editing the desired information retrieved from the remote site by the client in accordance with the parameter information; and means, recorded on the medium, for directing the processing system to provide an indicator related to the parameter in association with the displayed, user-selectable link.

36. A computer program product as recited in claim 35, wherein the means for directing to display a user-selectable link includes means, recorded on the medium, for directing the processing system to display one of (i) an icon, and (ii) a menu item.

37. A computer program product as recited in claim 35, wherein:

the communication network includes the Internet; and the means for directing to display a user-selectable link includes means, recorded on the medium, for directing the processing system to display a hyperlink as part of a displayed World Wide Web page.

38. A computer program product as recited in claim 35, wherein the means for directing to obtain includes:

means, recorded on the medium, for directing the processing system to send a test message to the remote site; and means, recorded on the medium, for directing the processing system to receive a response message from the remote site.

39. A computer program product as recited in claim 38, wherein the parameter, whose related information is obtained by the means for directing to obtain, includes a length of time required to download the second information from the remote site.

40. A computer program product as recited in claim 38, wherein the means for directing to obtain further comprises means, recorded on the medium, for directing the processing system to extract a parameter contained within the response message.

41. A computer program product as recited in claim 40, wherein the means for directing to extract includes means, recorded on the medium, for directing the processing system to extract a parameter related to one of:

(i) a size of the desired information, (ii) a cost of the desired information, (iii) a quality of the desired information, and (iv) a language of text within the desired information.

42. A computer program product as recited in claim 40, wherein:

the local display unit is operating in accordance with an operating context, for which different information items have differing degrees of appropriateness therewithin; and the means for directing to extract includes means, recorded on the medium, for directing the processing system to extract a parameter related to an appropriateness of the desired information.

43. A computer program product as recited in claim 35, wherein:

the parameter has a range of possible values; and the means for directing to provide an indicator includes means, recorded on the medium, for directing the processing system to provide one of a set of different indicia, each one of the indicia representing a respective portion of the range of values of the parameter.

44. A computer program product as recited in claim 43, wherein the means for directing to provide an indicator includes means, recorded on the medium, for directing the processing system to one of (i) display a visible indicator, (ii) provide an audible indicator, and (iii) provide a tactile indicator.

45. A computer program product as recited in claim 43, wherein:

the parameter includes an estimated length of time for downloading the desired information; and each successive one of the indicia represents a successively longer length of time.

46. A computer program product as recited in claim 45, wherein:

a set of time delay threshold values delimit ranges of delay times, each range corresponding with one of the indicia; and the means for directing to provide an indicator includes means, recorded on the medium, for directing the processing system to determine within which range the estimated time falls, and to display the one of the indicia corresponding with that range.

47. A computer program product as recited in claim 42, wherein the means for directing to provide an indicator includes means, recorded on the medium, for directing the processing system to display one of a set of indicia, the indicia of the set being distinct from each other in terms of at least one of (i) shape, and (ii) color.

48. A computer program product as recited in claim 42, wherein:

the means for directing to provide an indicator includes means, recorded on the medium, for directing the processing system, responsive to the user positioning a cursor on the displayed, user-selectable link, to one of (i) provide an audible signal, and (ii) provide tactile feedback through a cursor positioning device used by the user to perform the step of positioning.

49. A computer program product as recited in claim 43, wherein:

the parameter includes one of:

(i) a cost, within a portion of a range of costs, associated with the desired information;

(ii) a price, the indicator therefor being expressed in terms of a character string; and (iii) a language, the desired information including text in the language.

50. A computer program product as recited in claim 43, wherein:

the system has a current state, for which different information items have different degrees of appropriateness; and the parameter includes an indication of appropriateness of the desired information based on the current state of the system.

51. A computer program product as recited in claim 43, further comprising:

means, recorded on the medium, for directing the processing system to obtain information related to a second parameter of the desired information; and means, recorded on the medium, for directing the processing system to provide a second indicator related to the second parameter, concurrently with the first-recited parameter, in association with the displayed, user-selectable link.

52. The method according to claim 1, wherein said step of obtaining of information comprises a step separate from that of creation of the user-selectable link.

53. The method according to claim 1, wherein said step of obtaining of information originates from a source different from that of said user-selectable link.

54. The method according to claim 1, wherein said step of obtaining of information comprises a step performed at a time after creation of said user-selectable link.

55. The system according to claim 18, wherein said means for obtaining information obtains said information separately from that of creation of the user-selectable link.

56. The system according to claim 18, wherein said information, obtained by said means for obtaining, originates from a source different from that of said user-selectable link.

57. The system according to claim 18, wherein said means for obtaining information obtains said information at a time after creation of said user-selectable link.

58. The computer program product according to claim 35, wherein said information, obtained by said processing system, is separate from information at creation of the user-selectable link.

59. The computer program product according to claim 35, wherein said means for directing directs said processing system to obtain said information from a source different from that of said user-selectable link.

60. The computer program product according to claim 35, wherein said means for directing directs said processing system to obtain said information at a time after creation of said user-selectable link.

\* \* \* \* \*